(12) United States Patent
Feist et al.

(10) Patent No.: US 12,730,070 B2
(45) Date of Patent: Sep. 8, 2026

(54) DETECTION SYSTEM AND METHOD

(71) Applicant: SENSOR COATING SYSTEMS LIMITED, London (GB)

(72) Inventors: Jörg Peter Feist, London (GB); Solon Karagiannopoulos, London (GB); Christopher Charles Pilgrim, Bickington (GB); Pierre Sollazzo, The Hague (NL)

(73) Assignee: SENSOR COATING SYSTEMS LIMITED, London (GB)

( * ) Notice: Subject to any disclaimer, the term of this patent is extended or adjusted under 35 U.S.C. 154(b) by 27 days.

(21) Appl. No.: 18/006,903

(22) PCT Filed: Jul. 27, 2021

(86) PCT No.: PCT/GB2021/051930

§ 371 (c)(1),
(2) Date: Jan. 26, 2023

(87) PCT Pub. No.: WO2022/023730

PCT Pub. Date: Feb. 3, 2022

(65) Prior Publication Data

US 2023/0273127 A1 Aug. 31, 2023

(30) Foreign Application Priority Data

Jul. 27, 2020 (GB) .................................... 2011573

(51) Int. Cl.
*G01N 21/64* (2006.01)

(52) U.S. Cl.
CPC ..... *G01N 21/6456* (2013.01); *G01N 21/6408* (2013.01); *G01N 2021/6471* (2013.01); *G01N 2021/6484* (2013.01)

(58) Field of Classification Search
CPC ........... G01N 21/6456; G01N 21/6408; G01N 2021/6471; G01N 2021/6484;
(Continued)

(56) References Cited

U.S. PATENT DOCUMENTS

2009/0266999 A1* 10/2009 Krattiger ............ A61B 1/00194 250/459.1
2010/0032582 A1* 2/2010 Xia .................... G01N 21/6408 250/458.1

(Continued)

FOREIGN PATENT DOCUMENTS

EP 2108943 A2 10/2009

OTHER PUBLICATIONS

International Search Report and Written Opinion mailed Oct. 22, 2021 in corresponding International Application No. PCT/GB2021/051930.

*Primary Examiner* — Tarifur R Chowdhury
*Assistant Examiner* — Akbar H. Rizvi
(74) *Attorney, Agent, or Firm* — Renner, Otto, Boisselle & Sklar, LLP

(57) ABSTRACT

A detection system for detecting an optical signal from a luminescent material applied to or incorporated within an object comprises: at least one light source which generates light, as excitation light, for illuminating at least a region of the object; at least one detector which detects light, as collection light, from the object when illuminated by the excitation light and provides an output signal having a signal intensity in response to an intensity of the collection light; and a controller which is adapted to control the output signal to have a signal intensity within a predetermined range or at substantially a constant value, or post-process the output signal to extract the output signal at a signal intensity within a predetermined range or at substantially a constant value.

26 Claims, 11 Drawing Sheets

(58) Field of Classification Search
CPC ......... G01N 2021/8427; G01N 21/645; G02B 23/2469; H04N 23/70
See application file for complete search history.

(56) References Cited

U.S. PATENT DOCUMENTS

| | | | | |
|---|---|---|---|---|
| 2016/0270640 | A1 | 9/2016 | Fengler et al. | |
| 2017/0245735 | A1* | 8/2017 | Wang ................. | A61B 1/00009 |
| 2018/0214062 | A1* | 8/2018 | Keating ............. | A61K 49/0004 |
| 2019/0357757 | A1* | 11/2019 | Fengler ................ | A61B 1/0661 |
| 2020/0000341 | A1* | 1/2020 | Messerschmidt .. | G02B 23/2469 |
| 2020/0383558 | A1* | 12/2020 | Goebel .................. | A61B 1/043 |

* cited by examiner

DETECTION SYSTEM AND METHOD

This application is a national phase of International Application No. PCT/GB2021/051930 filed Jul. 27, 2021, which claims priority to United Kingdom Application No. 2011573.9 filed Jul. 27, 2020, each of which is incorporated herein by reference in its entirety.

The present invention relates to a detection system and method for detecting an optical signal, in particular luminescence from a luminescent material, such as a luminescent phosphor.

BACKGROUND OF THE INVENTION

Various proposals have been made for detection systems and methods for detecting optical signals, but there remains a need for an improved detection system and method for detecting an optical signal which addresses one or more of the problems presented by prior art arrangements. In this regard, the present invention seeks to provide an alternative detection system and method for detecting an optical signal which preferably addresses one or more of the problems presented by prior art arrangements.

SUMMARY OF THE INVENTION

In one aspect the present invention provides a detection system for detecting an optical signal from a luminescent material applied to or incorporated within an object, the system comprising: at least one light source which generates light, as excitation light, for illuminating at least a region of the object; at least one detector which detects light, as collection light, from the object when illuminated by the excitation light and provides an output signal having a signal intensity in response to an intensity of the collection light; and a controller which is adapted to control the output signal to have a signal intensity within a predetermined range or at substantially a constant value, or post-process the output signal to extract the output signal at a signal intensity within a predetermined range or at substantially a constant value.

In one embodiment the system further comprises: an optical probe assembly which comprises a fiber and a probe which is optically connected to the fiber so as to allow for transmission of the excitation light to and collection of the collection light from the object, optionally the fiber comprising (I) at least one excitation fiber element through which the excitation light is delivered to the probe, and at least one collection fiber element through which the collection light is delivered to the at least one detector, optionally the fiber comprising (i) a single excitation fiber element, optionally disposed on a central, longitudinal axis of the fiber, and/or (ii) a plurality of collection fiber elements, optionally disposed radially outwardly of the at least one excitation fiber element, or (II) a single fiber element, and further comprising: a beam splitter which is one of transmissive or reflective to light at a wavelength of the excitation light and the other of transmissive or reflective to light at a wavelength of the collection light, such that the excitation light is one of transmitted through or reflected by the beam splitter to the object and the collection light is the other of transmitted through or reflected by the beam splitter to the at least one detector.

In one embodiment the probe comprises an optical arrangement which includes a lens for delivering the excitation light from the at least one excitation fiber element to an illumination spot and the collection light from the illumination spot to the at least one collection fiber element, wherein optionally the illumination spot has a diameter of from about 50 μm to about 1500 μm, more preferably about 250 μm to about 1500 μm, wherein optionally the optical arrangement is configured to transmit and collect light (i) along an optical axis of the probe, optionally up to about 45 degrees in relation to the optical axis of the probe, or (ii) laterally of an optical axis of the probe, optionally from about 45 degrees to about 90 degrees in relation to the optical axis of the probe.

In one embodiment the at least one light source (i) is a laser, optionally a pulse-modulated laser, optionally having a controllable modulation duty cycle, optionally a solid-state laser, optionally a diode-pumped, solid-state laser, (ii) comprises one or more laser diodes, or (iii) comprises one or more light-emitting diodes (LEDs), optionally one or more high-power LEDs.

In one embodiment the excitation light has (i) a wavelength within a range of from about 250 nm to about 1100 nm, optionally a wavelength of about 532 nm or about 266 nm, and/or (ii) a power of from about 100 mW to about 2 kW, optionally operating in a continuous-wave mode.

In one embodiment the system further comprises: (I) at least one filter, optionally transmissive or reflective, for regulating a wavelength of the collection light which is collected by the at least one detector, wherein optionally the at least one filter is a bandpass filter, optionally the at least one filter is configured to filter out light of wavelengths outside the range of from about 450 nm to about 1600 nm; and/or (II) at least one intensity regulator, optionally transmissive or reflective, for regulating an intensity of the collection light which is collected by the at least one detector, wherein optionally disposed between the object and the at least one detector, wherein optionally the at least one intensity regulator is controlled by the controller to regulate the intensity of the collection light which is collected by the at least one detector, optionally the at least one intensity regulator is (I) a liquid crystal, which, by application of a bias voltage, regulates the intensity of the collection light, wherein optionally the intensity of the collection light is regulated by (i) applying a continuously-increasing bias voltage across a full dynamic range of the at least one intensity regulator, or (ii) closed-loop control between the at least one intensity regulator and the at least one detector, or (II) a plurality of neutral density filters with different optical densities, which are selectively provided, either manually or automatically, so as to control the intensity of the collection light, wherein optionally the at least one intensity regulator is controlled so as to alter the intensity of the excitation light during measurement so as to acquire optical signals for the excitation light at a plurality of intensities, wherein optionally a lifetime decay is extracted from each optical signal to yield a relationship between lifetime decay and signal amplitude, wherein optionally the system comprises: a plurality of intensity regulators, optionally a first intensity regulator between the at least one light source and the object and a second intensity regulator between the object and the at least one detector.

In one embodiment the at least one detector is (i) a photomultiplier module, optionally a silicon photomultiplier module (SiPM), (ii) a photodiode, optionally an avalanche photodiode, (iii) a photomultiplier tube (PMT), (iv) a multipixel photon counting device (MPPC), (v) a charge-coupled device (CCD), or (vi) a complementary metal-oxide-semiconductor (CMOS) device.

In one embodiment the at least one detector is (I) a one-dimensional array, optionally a spectrometer, wherein optionally the controller is configured to determine an intensity ratio of two emission peaks, with an amplitude of one peak being controlled to a desired level, as a control peak, and an intensity of the other peak being measured, as a measured peak, with a ratio of the intensities of the control and measured peaks being determined as the intensity ratio, or (II) a two-dimensional array, optionally a camera, wherein optionally the at least one light source is a pulsed light source configured to illuminate a two-dimensional illumination area on the object with the excitation light, and the at least one detector images a two-dimensional image area, as a field of view, on the object repeatedly at different delay times so as to acquire a lifetime decay.

In one embodiment the output signal of the at least one detector represents (i) a lifetime decay, or (ii) a phase shift observed in a time response of an output of the at least one detector when the at least one light source is sinusoidally modulated.

In one embodiment the intensity of the collection light is regulated by (I) adjusting a gain value of the at least one detector, wherein optionally the gain value of the at least one detector is regulated by a temperature-dependent proportional-integral-derivative (PID) controller, so as to minimize influence of change in temperature on the at least one detector, and/or (II) regulating an intensity of the excitation light, optionally (i) by modulating a power of the at least one light source, (ii) using a diffractive variable attenuator (DVA), or (iii) using an acousto-optic modulator (AOM).

In one embodiment the system further comprises: a plurality of light sources, each having a different wavelength, and a plurality of detectors, each for collecting the collection light at a different wavelength.

In another aspect the present invention provides a method of detecting an optical signal from a luminescent material applied to or incorporated within an object, comprising: providing a detection system comprising at least one light source which generates light, as excitation light, which illuminates at least a region of the object, at least one detector which detects light, as collection light, from the object when illuminated by the excitation light and provides an output signal having a signal intensity in response to an intensity of the collection light; and controlling the output signal to have a signal intensity within a predetermined range or at substantially a constant value, or post-processing the output signal to extract the output signal at a signal intensity within a predetermined range or at substantially a constant value.

In one embodiment the system further comprises an optical probe assembly which comprises a fiber and a probe which is optically connected to the fiber so as to transmit light to and collect light from the object, wherein optionally the fiber comprises (I) at least one excitation fiber element through which the excitation light is delivered to the probe, and at least one collection fiber element through which the collection light is delivered to the at least one detector, wherein optionally the fiber comprises (i) a single excitation fiber element, optionally disposed on a central, longitudinal axis of the fiber, and/or (ii) a plurality of collection fiber elements, optionally disposed radially outwardly of the at least one excitation fiber element, or (II) a single fiber element, and the system further comprises a beam splitter which is one of transmissive or reflective to light at a wavelength of the excitation light and the other of transmissive or reflective to light at a wavelength of the collection light, such that the excitation light is one of transmitted through or reflected by the beam splitter to the object and the collection light is the other of transmitted through or reflected by the beam splitter to the at least one detector.

In one embodiment the probe comprises an optical arrangement which includes a lens for delivering the excitation light from the at least one excitation fiber element to an illumination spot and for delivering the collection light from the illumination spot to the at least one collection fiber element, wherein optionally the illumination spot has a diameter of from about 50 μm to about 1500 μm, more preferably about 250 μm to about 1500 μm, wherein optionally the optical arrangement is configured to transmit and collect light (i) along an optical axis of the probe, optionally up to about 45 degrees in relation to the optical axis of the probe, or (ii) laterally of an optical axis of the probe, optionally from about 45 degrees to about 90 degrees in relation to the optical axis of the probe.

In one embodiment the at least one light source (i) is a laser, optionally a pulse-modulated laser, optionally having a controllable modulation duty cycle, optionally a solid-state laser, optionally a diode-pumped, solid-state laser, (ii) comprises one or more laser diodes, or (iii) comprises one or more light-emitting diodes (LEDs), optionally one or more high-power LEDs.

In one embodiment the excitation light has (i) a wavelength within a range of from about 250 nm to about 1100 nm, optionally a wavelength of about 532 nm or about 266 nm, and/or (ii) a power of from about 100 mW to about 2 kW, optionally operating in a continuous-wave mode.

In one embodiment the system further comprises (I) at least one filter, optionally transmissive or reflective, to regulate a wavelength of the collection light which is collected by the at least one detector, wherein optionally the at least one filter is a bandpass filter, optionally the at least one filter is configured to filter out light of wavelengths outside the range of from about 450 nm to about 1600 nm, and/or (II) at least one intensity regulator, optionally transmissive or reflective, to regulate the intensity of the collection light which is collected by the at least one detector, optionally disposed between the object and the at least one detector, wherein optionally the at least one intensity regulator is controlled by the controller to regulate the intensity of the light which is collected by the at least one detector, wherein optionally the at least one intensity regulator is (I) a liquid crystal, which, by application of a bias voltage, regulates the intensity of the collection light, wherein optionally the intensity of the collection light is regulated by (i) applying a continuously-increasing bias voltage across a full dynamic range of the at least one intensity regulator, or (ii) closed-loop control between the at least one intensity regulator and the at least one detector; or (II) a plurality of neutral density filters with different optical densities, which are selectively provided, either manually or automatically, so as to control the intensity of the collection light, wherein optionally the at least one intensity regulator is controlled to alter the intensity of the excitation light during measurement so as to acquire optical signals for the excitation light at a plurality of intensities, optionally a lifetime decay is extracted from each optical signal to yield a relationship between lifetime decay and signal amplitude, wherein optionally the system comprises a plurality of intensity regulators, optionally a first intensity regulator between the at least one light source and the object and a second intensity regulator between the object and the at least one detector.

In one embodiment the at least one detector is (i) a photomultiplier module, optionally a silicon photomultiplier module (SiPM), (ii) a photodiode, optionally an avalanche photodiode, (iii) a photomultiplier tube (PMT), (iv) a multipixel photon counting device (MPPC), (v) a charge-coupled device (CCD), or (vi) a complementary metal-oxide-semiconductor (CMOS) device.

In one embodiment the at least one detector is (I) a one-dimensional array, optionally a spectrometer, optionally further comprising:

determining an intensity ratio of two emission peaks, with an amplitude of one peak being controlled to a desired level, as a control peak, and an intensity of the other peak being measured, as a measured peak, with a ratio of the intensities of the control and measured peaks being determined as the intensity ratio; or (II) a two-dimensional array, optionally a camera, wherein optionally the at least one light source is a pulsed light source and further comprising: illuminating a two-dimensional illumination area on the object with the excitation light; and imaging a two-dimensional image area, as a field of view, on the object repeatedly at different delay times so as to acquire a lifetime decay.

In one embodiment the output signal of the at least one detector represents (i) a lifetime decay, or (ii) a phase shift observed in a time response of an output of the least one detector when the at least one light source is sinusoidally modulated.

In one embodiment the intensity of the collection light is regulated by (I) adjusting a gain value of the at least one detector, wherein optionally the gain value of the at least one detector is regulated by a temperature-dependent proportional-integral-derivative (PID) controller, so as to minimize influence of change in temperature on the at least one detector, and/or (II) regulating an intensity of the excitation light, optionally (i) by modulating a power of the at least one light source, (ii) using a diffractive variable attenuator (DVA), or (iii) using an acousto-optic modulator (AOM).

In one embodiment the system comprises a plurality of light sources, each having a different wavelength, and a plurality of detectors, each for collecting the collection light at a different wavelength.

The present invention provides for a reproducible output, having stable intensity, insensitive to system and environmental factors, such as non-linearity in detectors, pollution and transmission losses in optics and angle of illumination or detection, which allows for accurate measurement of parameters, such as temperature or erosion, from the detected optical signal.

BRIEF DESCRIPTION OF THE DRAWINGS

Preferred embodiments of the present invention will now be described hereinbelow by way of example only with reference to the accompanying drawings, in which.

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "substantially" means preferably at least 90%, more preferably 95%, even more preferably 98%, most preferably 99%.

Within the context of this specification, the word "comprises" means "includes, among other things" and should not be construed to mean "consists of only".

Figure 1:
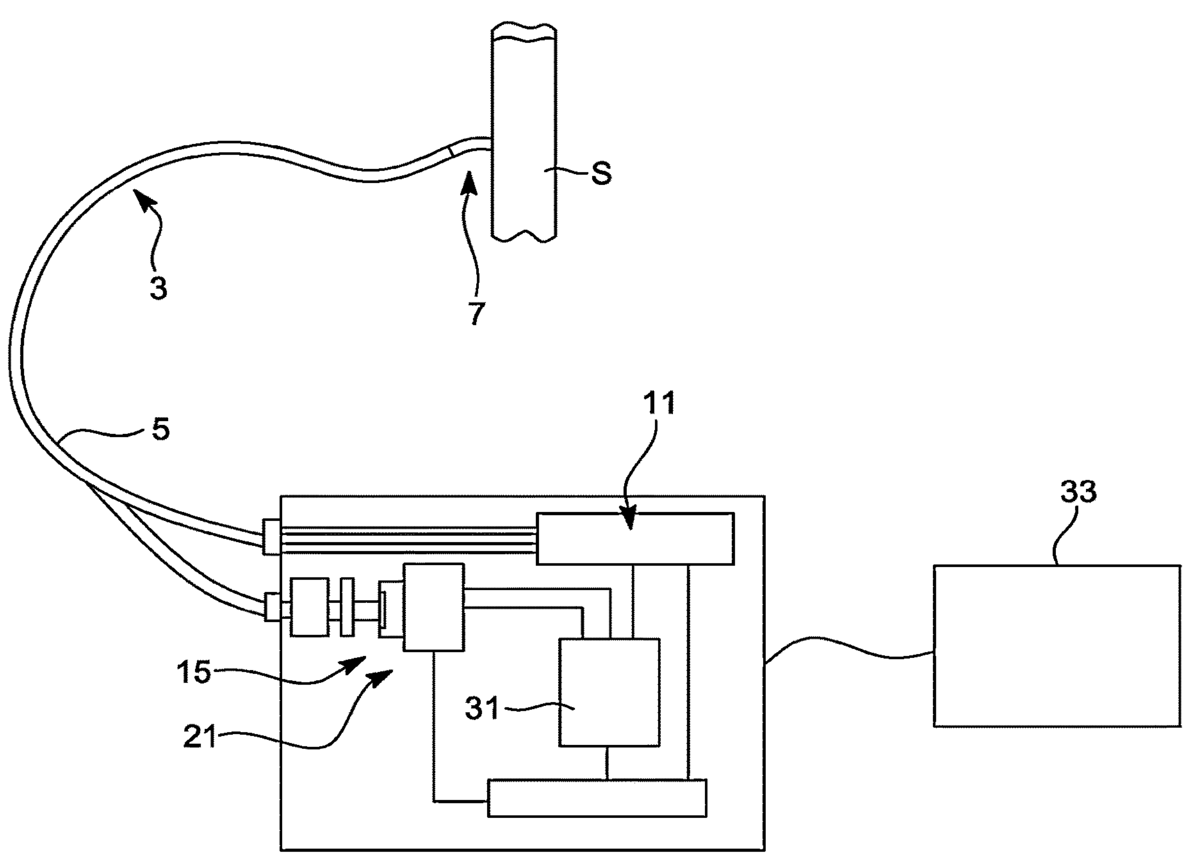
FIG. 1 illustrates a detection system in accordance with one embodiment of the present invention.

FIG. 1 illustrates a detection system in accordance with one embodiment of the present invention.

The system comprises an optical probe assembly 3 which comprises a fiber 5 and a probe 7 which is optically connected to the fiber 5 so as to allow for the transmission of light to and from a sample S, here having a luminescent coating.

Exemplary materials for the luminescent coating are as follows, where the rare earths (RE) include La, Ce, Pr, Nd, Pm, Sm, Eu, Gd, Tb, Dy, Ho, Er, Tm, Yb and Lu.

Figure 2:
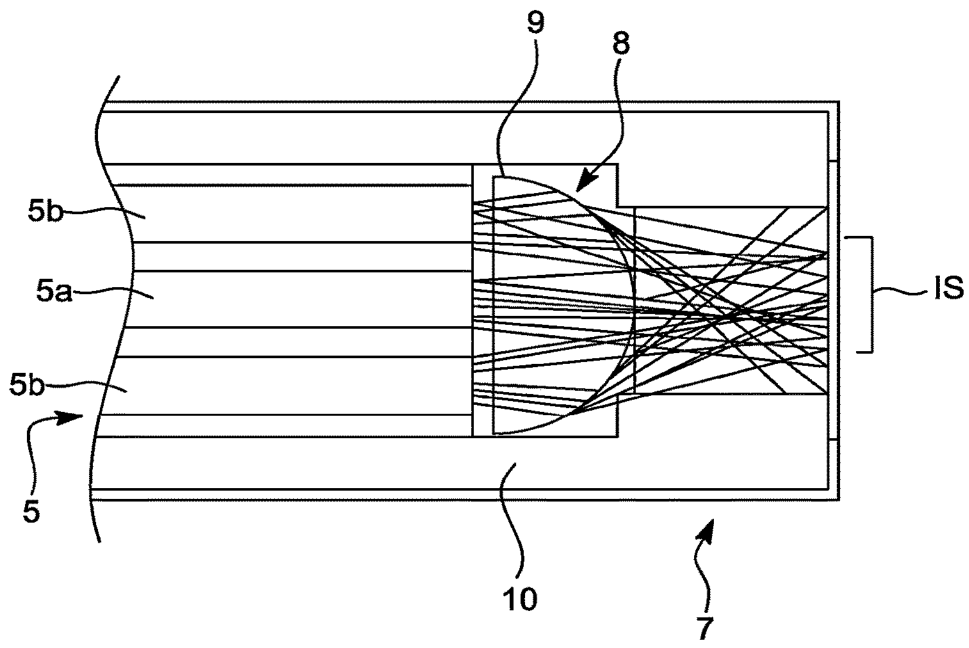
FIG. 2 illustrates a cross-sectional view of the distal end of the probe assembly of the system of FIG. 1.

$Sr_4Al_{14}O_{25}$:RE,typically Eu $Mg_4FGeO_6$:Mn or RE $CeMgAl_{11}O_{19}$:RE,typically Tb $BaMgAl_{10}O_{17}$:RE,typically Eu $RE(PO_3)_2$,typically Eu $Ca_{10}(PO_4)_6(F,Cl)_2$:Sb,Mn or RE $(Sr,Mg)_3(PO_4)_2$:Sn or RE $LaPO_4$:RE,typically Ce or Tb $Y_2O_3$:RE,typically Eu $Y_2O_2S$:RE,typically Eu $Zn_2SiO_4$:Mn or RE $Mg_4GeO_{5.5}F$:Mn or RE $SrB_4O_7$:RE,typically Eu $Sr_6BP_5O_{20}$:RE,typically Eu $Gd(Zn,Mg)B_5O_{10}$:RE,typically Ce $Y_3Al_5O_{12}$:RE,typically Ce $Y(V,P,B)O_4$:RE,typically Eu YSZ:RE,typically Eu $Al_2O_3$:Cr or RE $REAl_3B_4O_{12}$,typically Eu $Ca_2Y_8(SiO_4)_6O_2$:RE $CaMoO_4$:RE $Gd_2O_3$:RE $La_2O_3$:RE $La_{9.33}(SiO_6)_4O_2$:RE $Lu_2O_3$:RE $RE(SiO(OH)_3)$ $SrAl_2O_4$:RE $K_2O_3Si$:RE $Y_2Si_2O_7$:RE $Y_2SiO_5$:RE $Na_2xSiO_{2+x}$:RE $Y_4Al_2O_9$:RE $Y_4Si_3O_{12}$:RE $SiO_2$:RE $YAlO_3$:RE $Yb_2Si_2O_7$:RE YOCl:RE $YVO_4$:RE $ZrO_2$:RE $MgSi_2O_6$:RE $ZnPO_4$:RE $Gd_2O_2S$:RE $Ca_5F(PO_4)_3$:RE $LaMgAl_{11}O_{19}$:RE $BaSi_2O_5$:RE In this embodiment, as illustrated in FIG. 2, the fiber 5 comprises at least one excitation fiber element 5*a* through which excitation light is delivered to the probe 7, and at least one collection fiber element 5*b* through which collection light is delivered to a detector 21, as will be described in more detail hereinbelow.

In this embodiment the fiber 5 comprises a single excitation fiber element 5*a*, here located on the central axis of the fiber 5.

In this embodiment the fiber 5 comprises a plurality of collection fiber elements 5*b*, here located radially outwardly of the excitation fiber element 5*a*.

In this embodiment the probe 7 comprises an optical arrangement 8 which includes a lens 9 for delivering excitation light from the at least one excitation fiber element 5*a* to an illumination spot IS and for delivering collection light from the illumination spot IS to the at least one collection fiber element 5*b*.

In this embodiment the illumination spot IS has a diameter of about 800 μm.

In one embodiment the illumination spot IS has a diameter of from about 50 μm to about 1500 μm, more preferably about 250 μm to about 1500 μm.

In this embodiment the lens 9 is a half-ball lens, here having a diameter of 4 mm and a focal length of 3 mm.

In this embodiment the probe 7 comprises a lens holder 10 which is attached to the fiber 5 and holds the lens 9.

In an alternative embodiment the lens 9 could be bonded to the fiber 5, without the lens holder 10.

In this embodiment, as illustrated in FIG. 2, the optical arrangement 8 is configured to emit and collect light along an optical axis of the probe 7, typically up to about 45 degrees in relation to the optical axis of the probe 7.

Figure 3:
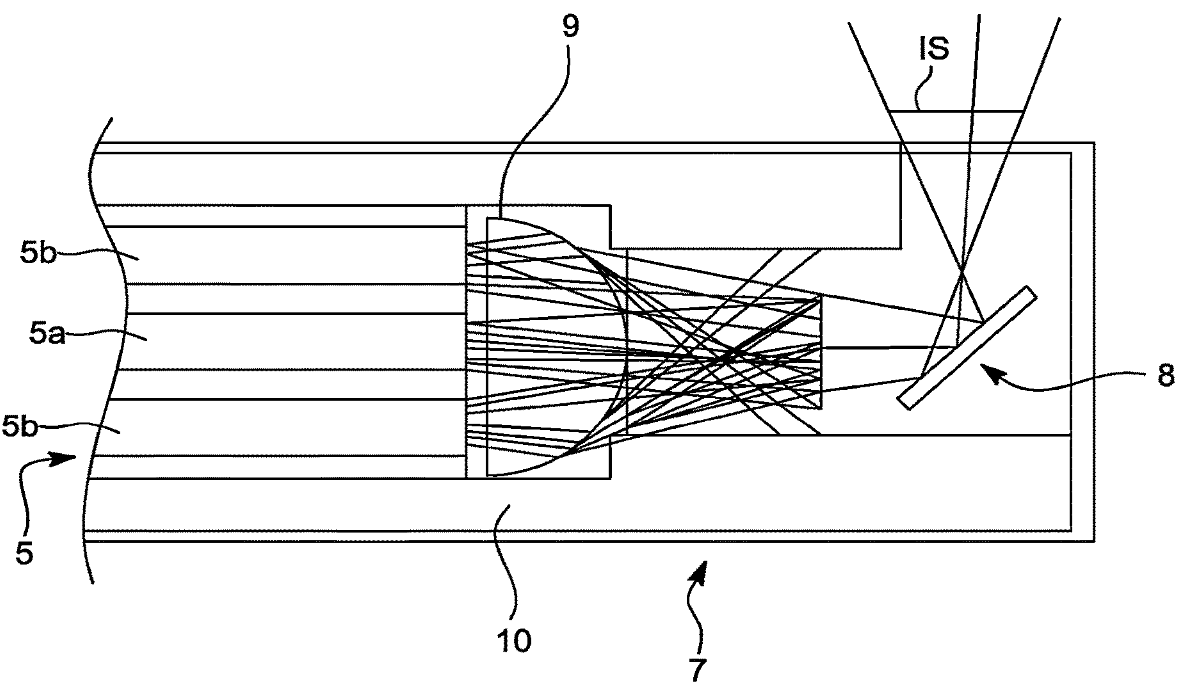
FIG. 3 illustrates a cross-sectional view of the distal end of a probe assembly as a modification of the probe assembly of the system of FIG. 1.
Figure 4:
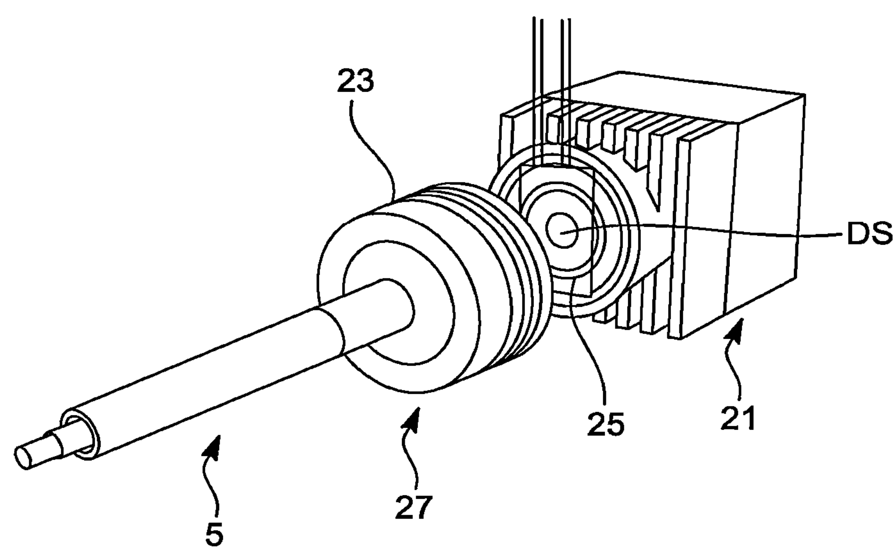
FIG. 4 illustrates a perspective view of the detector unit of the system of FIG. 1.

In one alternative embodiment, as illustrated in FIG. 3, the optical arrangement 8 could be configured to emit and collect light laterally of the optical axis of the probe 7, typically from about 45 degrees to about 90 degrees in relation to the optical axis of the probe 7.

The system further comprises a light source 11 for generating excitation light which is optically coupled to the probe assembly 3.

In this embodiment the light source 11 is tuneable to have one or more of a defined power, a defined duration of exposure or a defined modulation.

In this embodiment the light source 11 is a laser.

In this embodiment the light source 11 is a pulse-modulated laser, here having a controllable modulation duty cycle.

In this embodiment the light source 11 is a solid-state laser, here a diode-pumped, solid-state laser.

In an alternative embodiment the light source 11 could comprise one or more laser diodes.

In another embodiment the light source 11 could comprise one or more light-emitting diodes (LEDs), in particular one or more high-power LEDs, such as M530L4 (as available from Thorlabs, Ely, UK).

In this embodiment the excitation light has a wavelength of 532 nm.

In an alternative embodiment the excitation light could have a wavelength of 266 nm.

In one embodiment the excitation light has a wavelength of from about 250 nm to about 1080 nm.

In this embodiment the excitation light has a power of 400 mW, here operating in a continuous wave mode.

In one embodiment the excitation light has a power of from about 100 mW to about 2 kW.

The system further comprises a detector unit 15 which is optically coupled to the at least one collection fiber 5*b* of the probe assembly 3 and detects an intensity of the collection light.

Figure 5:
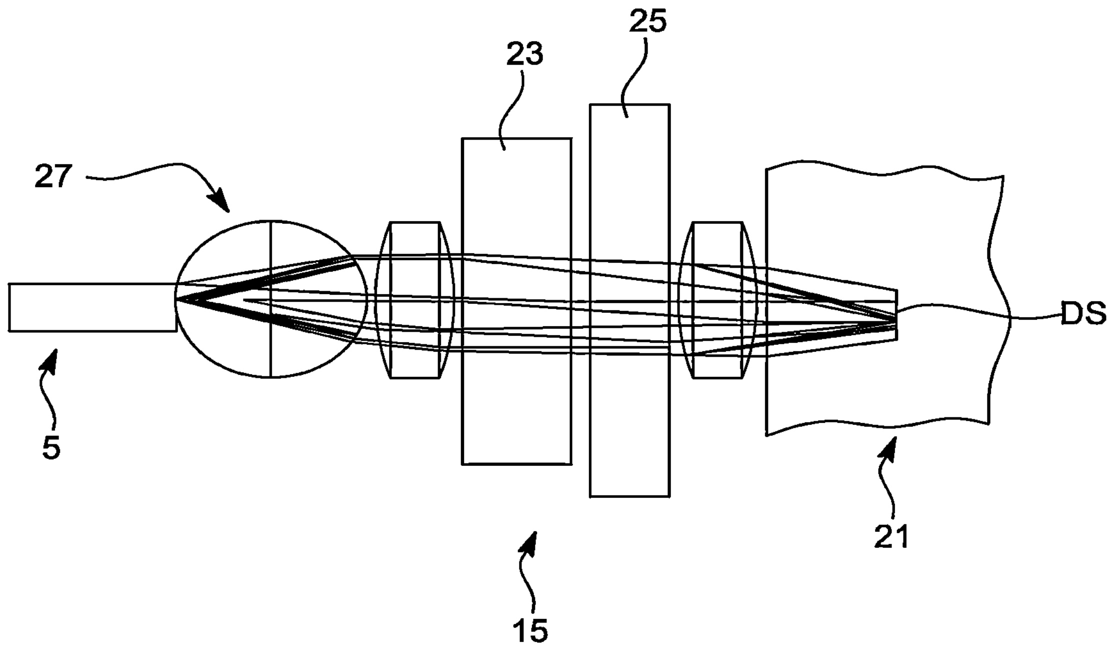
FIG. 5 represents the optical layout of the detector unit of the system of FIG. 1.

In this embodiment, as illustrated in FIG. 5, the detector unit 15 comprises at least one detector 21, here a single detector 21, which provides an output signal in response to an intensity of the received light, at least one filter 23 for regulating a wavelength of the light which is passed to the at least one detector 21, an intensity regulator 25 for regulating an intensity of the light which is received by the at least one detector 21, and an optical arrangement 27 for delivering the light from the at least one collection fiber 5*b* to a detection spot DS on the at least one detector 21.

In this embodiment the at least one detector 21 is a photomultiplier module, here a silicon photomultiplier module (SiPM), here part MiniSM, as supplied by SensL (Cork, Ireland).

In an alternative embodiment the at least one detector 21 could be a photodiode, such as an avalanche photodiode.

In another alternative embodiment the at least one detector 21 could be a photomultiplier tube (PMT).

In still another alternative embodiment the at least one detector 21 could be a multipixel photon counting device (MPPC).

In yet another alternative embodiment the at least one detector 21 could be a charge-coupled device (CCD) or a complementary metal-oxide-semiconductor (CMOS) device.

In this arrangement the at least one detector 21 could be either a two-dimensional array, such as a camera, or a one-dimensional array, such as a spectrometer. When arranged as a spectrometer, the system could be used to record an intensity ratio of two emission peaks. In one embodiment the amplitude of one peak could be controlled to a desired level, as a control peak, using the intensity regulator 25, and the intensity of the other peak measured, as a measured peak, with a ratio of the intensities of the control and measured peaks being determined.

In this embodiment the at least one filter 23 is a bandpass filter.

In this embodiment the at least one filter 23 filters out light of wavelengths outside the range of from about 450 nm to about 1600 nm.

In this embodiment the intensity regulator 25 is regulated by a controller 31 to regulate an intensity of the light which is received by the at least one detector 21 so as to provide the output signal of the at least one detector 21 with a constant signal intensity.

Figure 6:
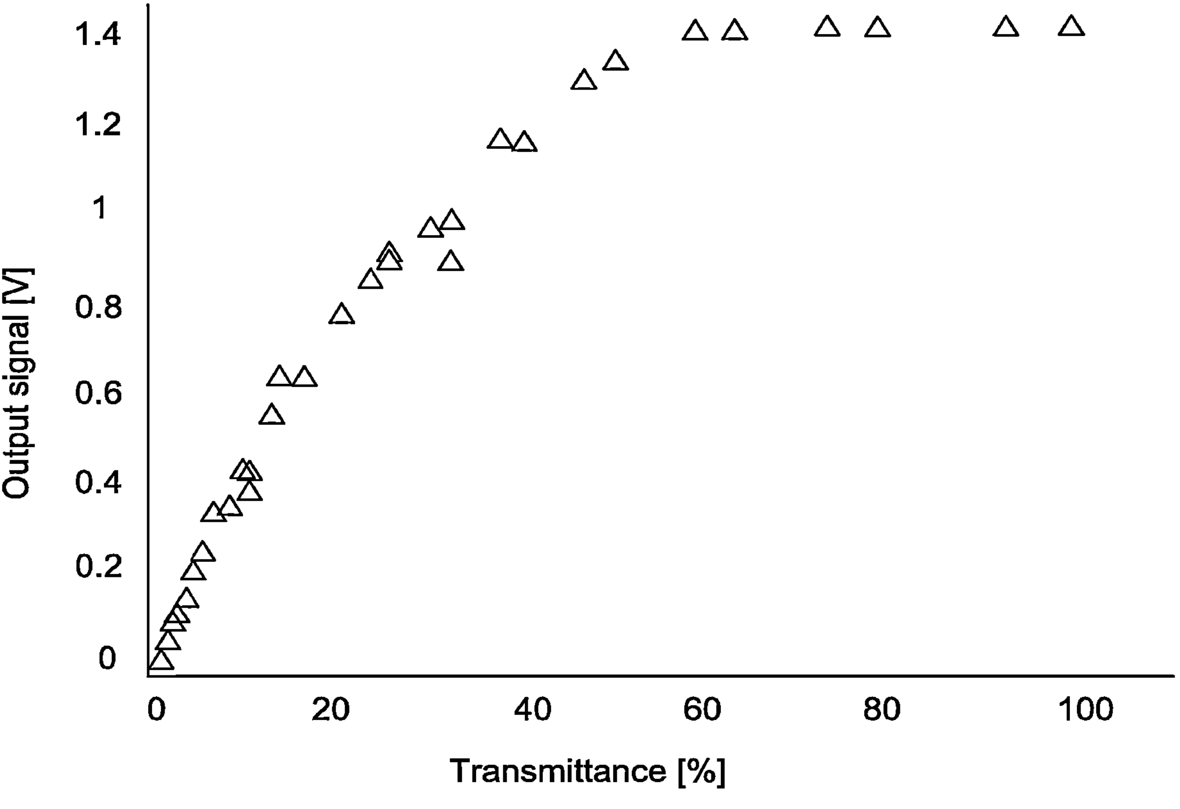
FIG. 6 illustrates the output signal of the detector of the detector unit as a function of transmittance of the intensity regulator of the system of FIG. 1.

FIG. 6 illustrates the relationship of the output signal of one detector 21 to the transmittance of the intensity regulator 25. As will be seen, by regulation of the intensity of the collection light through operation of the intensity regulator 25, the intensity of the output signal of the detector 21 can be controlled so as to be maintained at a constant value.

In this embodiment the output signal represents a lifetime decay of a luminescent coating.

In an alternative embodiment the output signal could represent a phase shift observed in a time response of an output of the detector 21 when the light source 11 is sinusoidally modulated.

In this embodiment the intensity regulator 25 is a liquid crystal, which, by application of a bias voltage, regulates the intensity of the delivered light.

In this embodiment the intensity of the delivered light is regulated by applying a continuously-increasing bias voltage across the full dynamic range of the intensity regulator 25.

In an alternative embodiment the intensity of the delivered light could be regulated by closed-loop control, such as by a proportional-integral-derivative (PID) controller, between the intensity regulator 25 and the at least one detector 21.

In another alternative embodiment the intensity regulator 25 could comprise several neutral density filters with varying optical densities, which can be changed, either manually or automatically, so as to control an intensity of the delivered light.

In still another alternative embodiment an intensity of the delivered light could be regulated by adjusting a gain value of the at least one detector 21. In this embodiment the output signal of the at least one detector 21 could be directly controlled, and the intensity regulator 25 omitted.

In this embodiment the gain value of the detector 21 could be regulated by a temperature-dependent proportional-integral-derivative (PID) controller, so as to minimize influence of change in temperature on the at least one detector 21.

In yet another alternative embodiment an emitted intensity of the light source 11 could be regulated by modulating power of a laser light.

In still yet another alternative embodiment an emitted intensity of the light source 11 could be regulated using a diffractive variable attenuator (DVA).

In a yet further alternative embodiment an emitted intensity of the light source 11 could be regulated using an acousto-optic modulator (AOM).

In still another alternative embodiment the suitable intensity value could be extracted subsequently in post-processing.

In this embodiment the intensity regulator 25 could be controlled to alter the emitted intensity of the light source 11 during measurement so as to acquire signals over a range of intensities.

In one embodiment a lifetime decay could be extracted from each signal to yield a relationship between lifetime decay and signal amplitude. This relationship can then be used to correct a lifetime decay to compensate for varying signal amplitude.

The system further comprises a controller 31, here a personal computer (PC), which controls operation of the system, and a display 33.

The present inventors have recognized that the response of the at least one detector 21 is not linear, and regulation of the intensity of the output signal of the at least one detector 21 at a constant value allows for the output signal of the at least one detector 21 more reproducibly and accurately to represent the parameter which is being measured.

Figure 7:
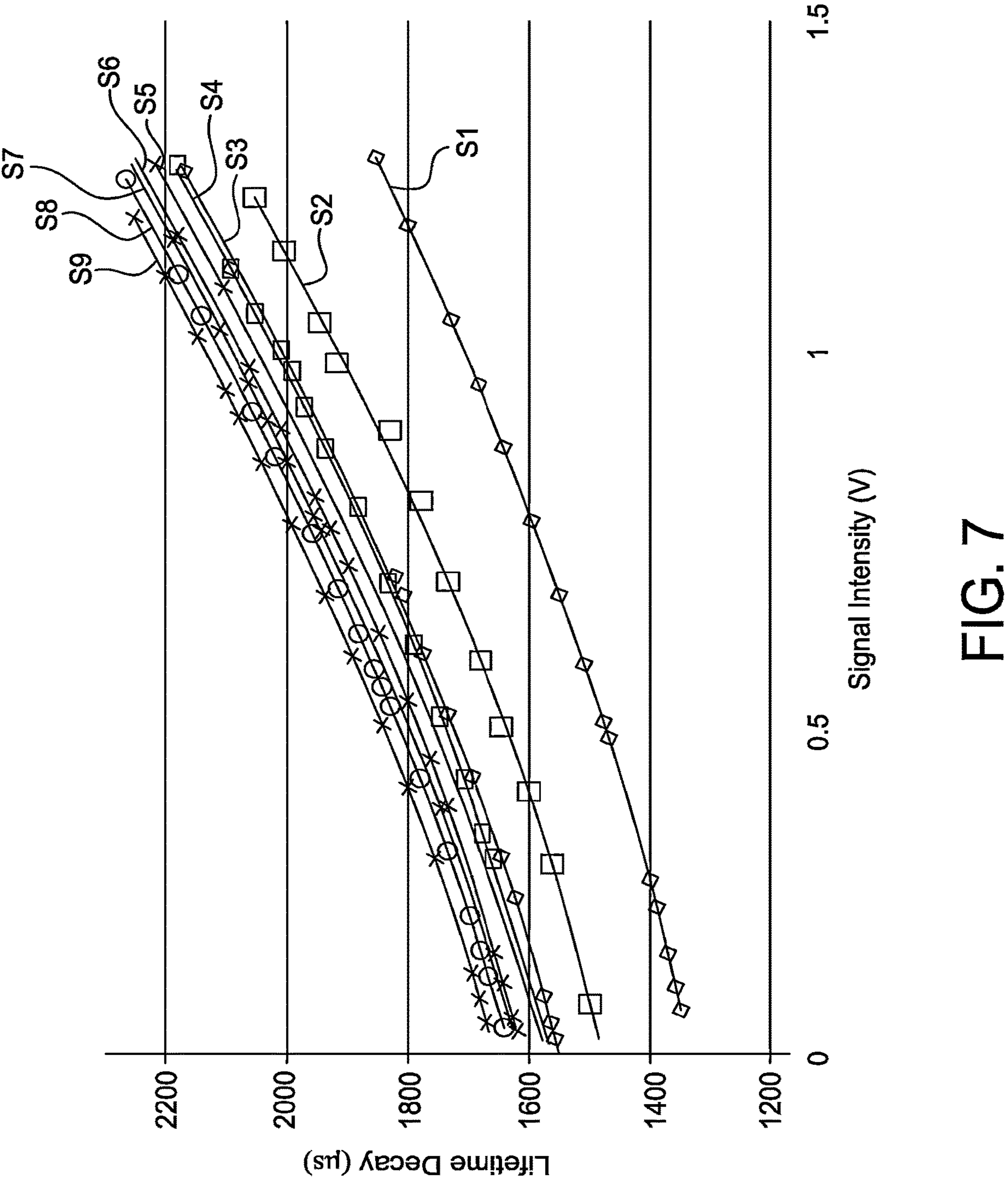
FIG. 7 illustrates the variation in lifetime decay as a function of signal intensity for a range of samples using the system of FIG. 1.

FIG. 7 illustrates the variation in lifetime decay as a function of the intensity of the output signal from one detector 21 for a range of samples S1-S9, from which the significance of maintaining the intensity of the output signal of the detector 21 constant can be seen.

Figure 8:
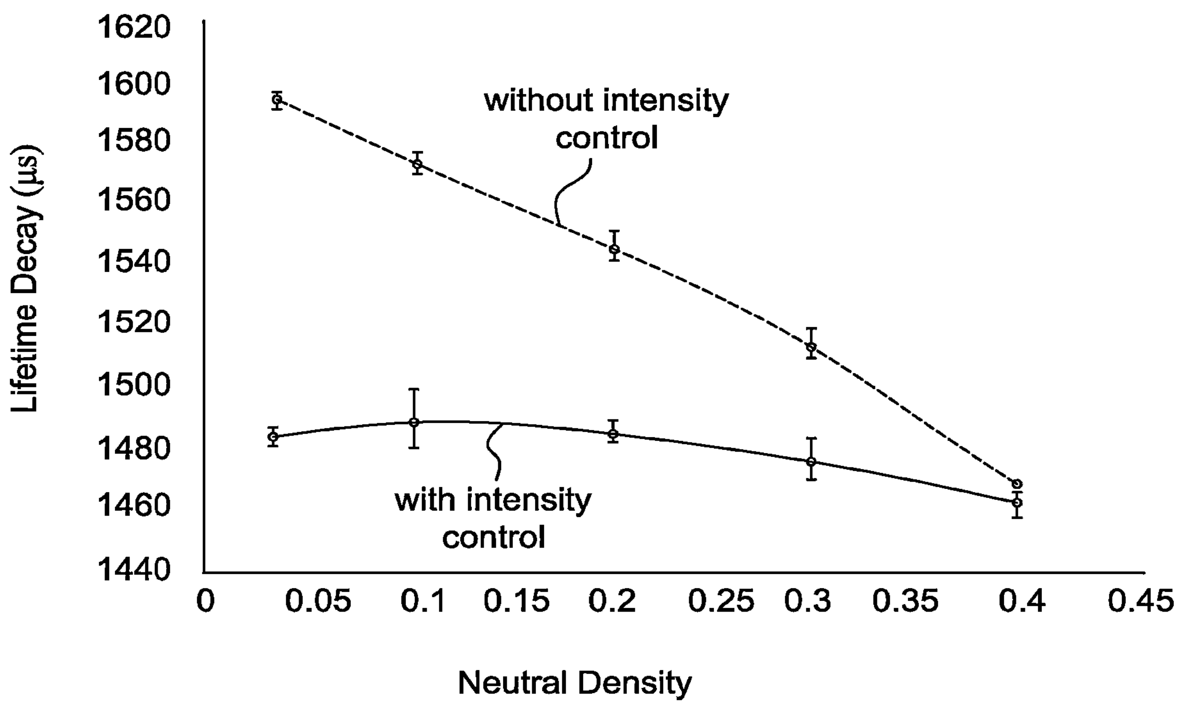
FIG. 8 illustrates the variation in lifetime decay, with and without control of the intensity of the output signal from one detector of the system of FIG. 1, as a function of signal reduction.

FIG. 8 illustrates the variation in lifetime decay, with and without control of the intensity of the output signal from one detector 21, as a function of signal reduction, by regulating an intensity of the collection light, for one sample S.

In this simulation, neutral density (ND) filters of different density (0.025, 0.1, 0.2, 0.3 and 0.4) were placed on top of the sample S to simulate controlled amounts of signal reduction. As will be seen, by maintaining the intensity of the output signal from the detector 21 at a constant value, the measured lifetime decay of the luminescent material is substantially constant, whereas, without control of the signal intensity, the lifetime decay shows a marked decrease with increasing opacity of the ND filters. This demonstrates clearly that, with control of the signal intensity, variation in the intensity of the collection light, which could be caused by environmental factors, such as pollution and staining, is accommodated by the present invention and still enables an accurate, reproducible measurement.

Figure 9:
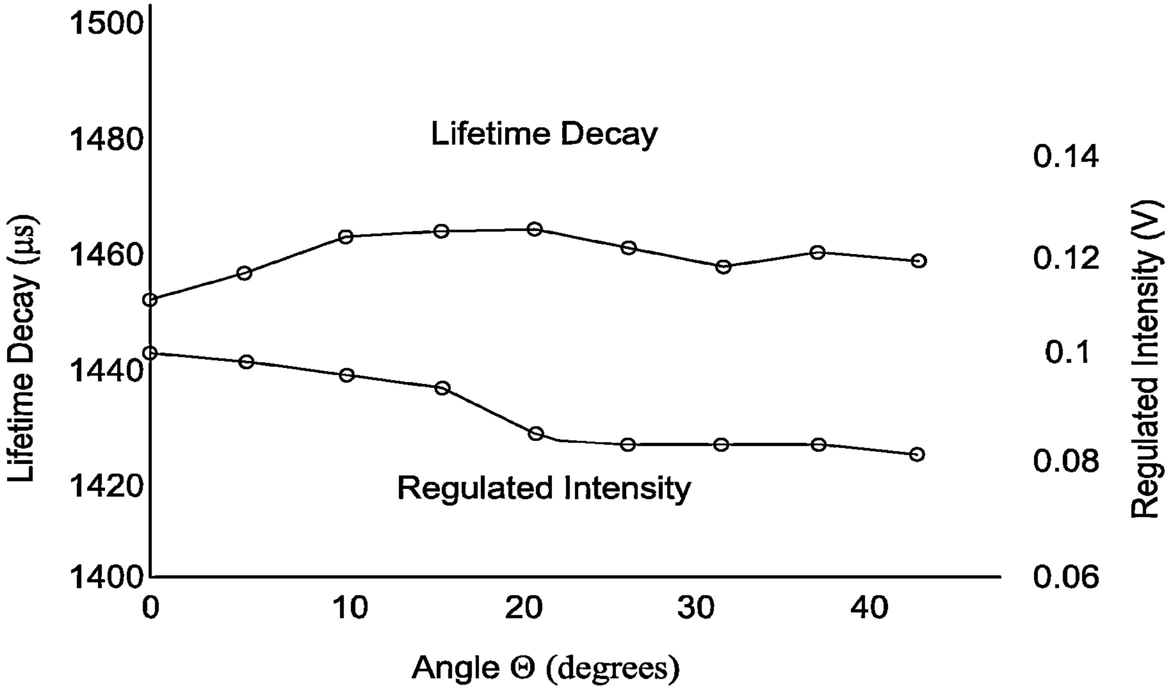
FIG. 9 illustrates the variation in lifetime decay, with control of the intensity of the output signal from one detector of the system of FIG. 1, as a function of angular relationship between the probe of the system of FIG. 1 and a surface of a sample.

FIG. 9 illustrates the variation in lifetime decay, with control of the intensity of the output signal from one detector 21, as a function of angular relationship between the probe 7 and a surface of the sample S, with the angle (0) being that between a direction orthogonal to the axis of the probe 7 and the surface of the sample S.

As will be seen, by maintaining the intensity of the output signal from the detector 21 at a constant value, the measured lifetime decay of the luminescent material remains substantially constant. This demonstrates clearly that, with control of the signal intensity, variation in the intensity of the collection light, which could be caused by orientation of the probe 7 and the sample S, is accommodated by the present invention and still enables an accurate, reproducible measurement.

Figure 10:
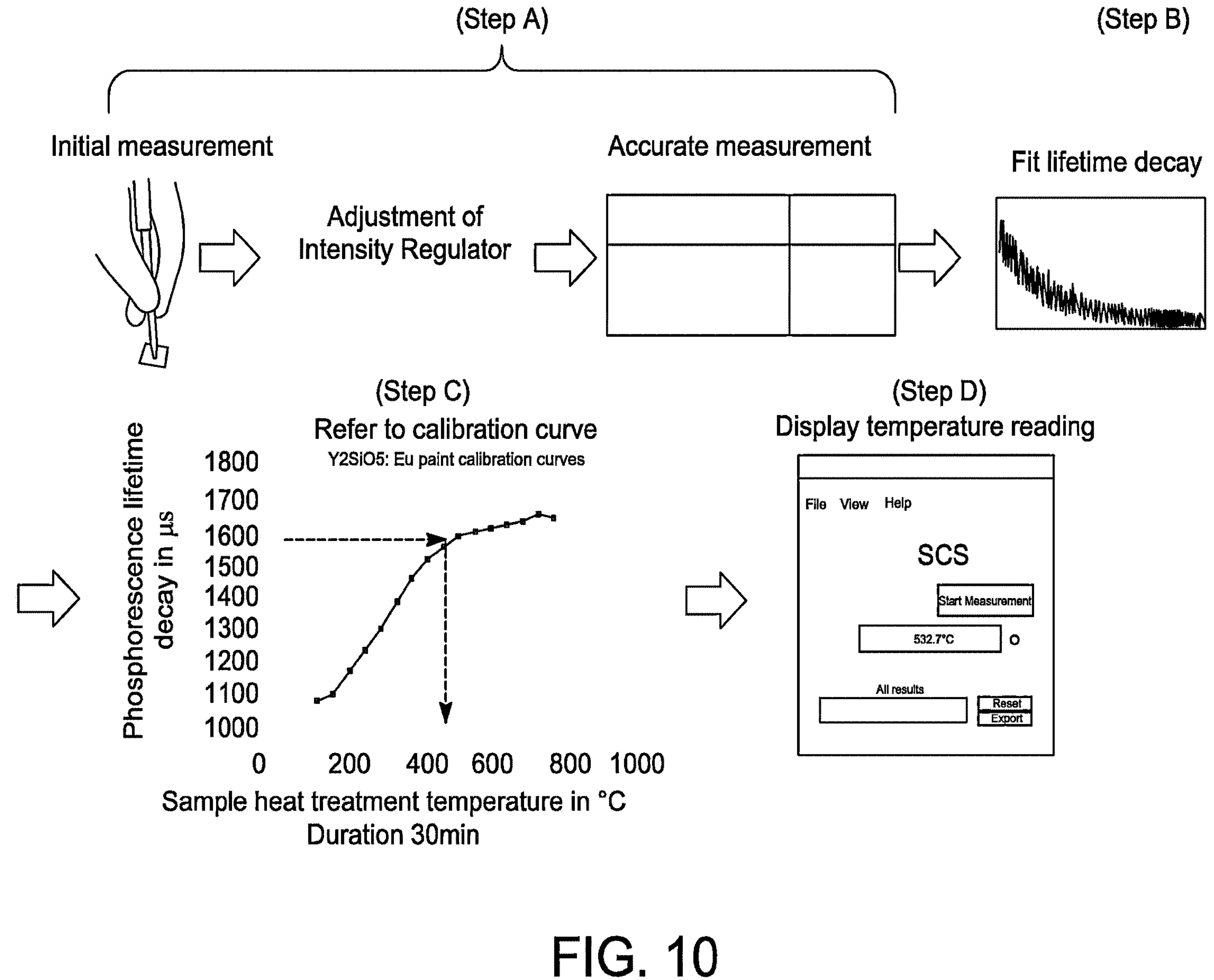
FIG. 10 illustrates the scheme of one mode of operation of the system of FIG. 1.

FIG. 10 illustrates a scheme of one mode of operation of the detection system.

In a first step (Step A), an initial intensity scan is taken of the collection light from the sample S and the controller 31 controls the intensity regulator 25 to regulate the delivered light so that the output signal of the detector 21 is at a predetermined constant value, and then a full intensity scan is taken from the sample S, here a measurement of lifetime decay.

In a next step (Step B), the lifetime decay is fitted to a curve so as to determine a value for lifetime decay.

In a next step (Step C), the fitted value for lifetime decay is referenced to a calibration curve or look-up table, and a parameter determined, which represents an environmental factor to which the sample S has been exposed.

In a final step (Step D), the determined parameter is presented to a user on the display 33.

In this embodiment the environmental factor represents the thermal environment and the parameter is temperature.

Finally, it will be understood that the present invention has been described in its preferred embodiments and can be modified in many different ways without departing from the scope of the invention as defined by the appended claims.

In the described embodiments the at least one filter 23 and the intensity regulator 25 are configured to be transmissive, but in alternative embodiments could operate in a reflectance mode.

In one modification, the probe 7 could include a trigger so as to automatically trigger operation of the system. This trigger could be a contact or non-contact sensor, and be an optical, magnetic or electric sensor.

In another modification, the probe 7 could include a stand-off so as not to contact the sample S in the region of inspection.

In a further modification, the probe 7 could include a self-alignment mechanism, so as to ensure that the probe 7 views the inspection surface at the required angle.

Figure 11:
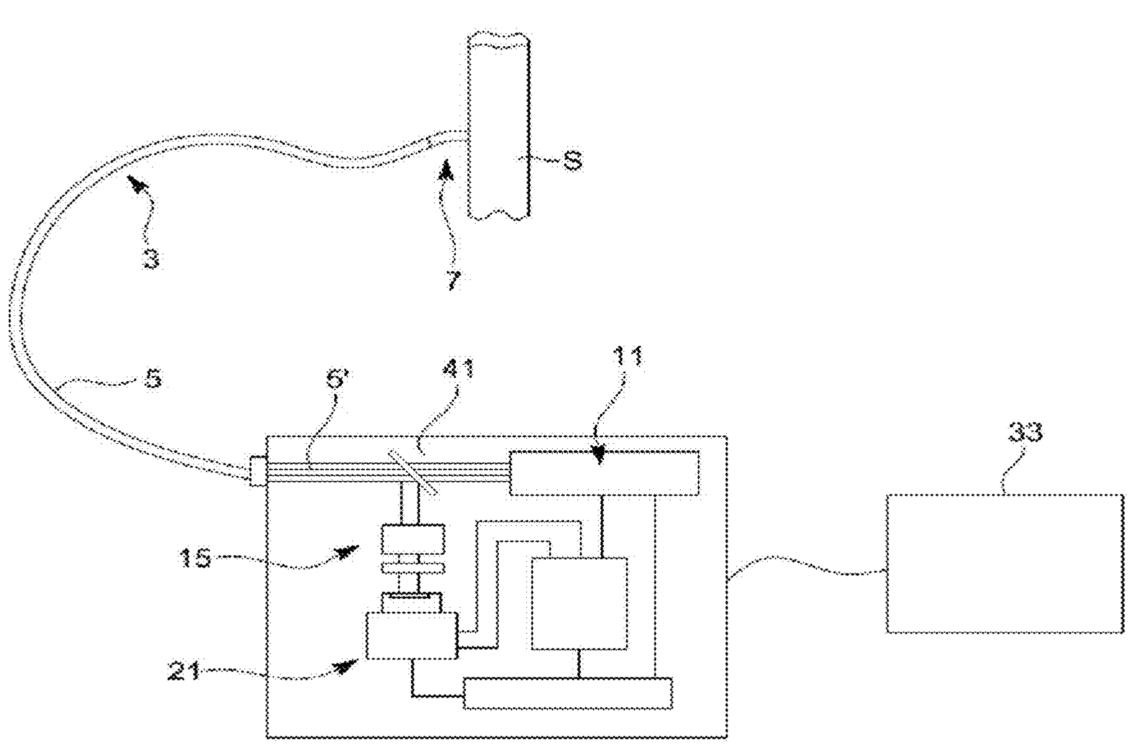
FIG. 11 illustrates a detection system as one modification of the system of FIG. 1.

In another modification, as illustrated in FIG. 11, the fiber 5, instead of having separate fiber elements 5*a, b* for excitation and collection light, could have only a single fiber element 5', and incorporate a beam splitter 41 which is transmissive to light at the excitation wavelength and reflective to light at the collection wavelength, such that excitation light is transmitted through the beam splitter 41 to the probe 7 and collection light is reflected by the beam splitter 41 to the at least one detector 21. This configuration would allow for a smaller form factor, and could allow greater bending radii and hence have reduced space requirements.

Figure 12:
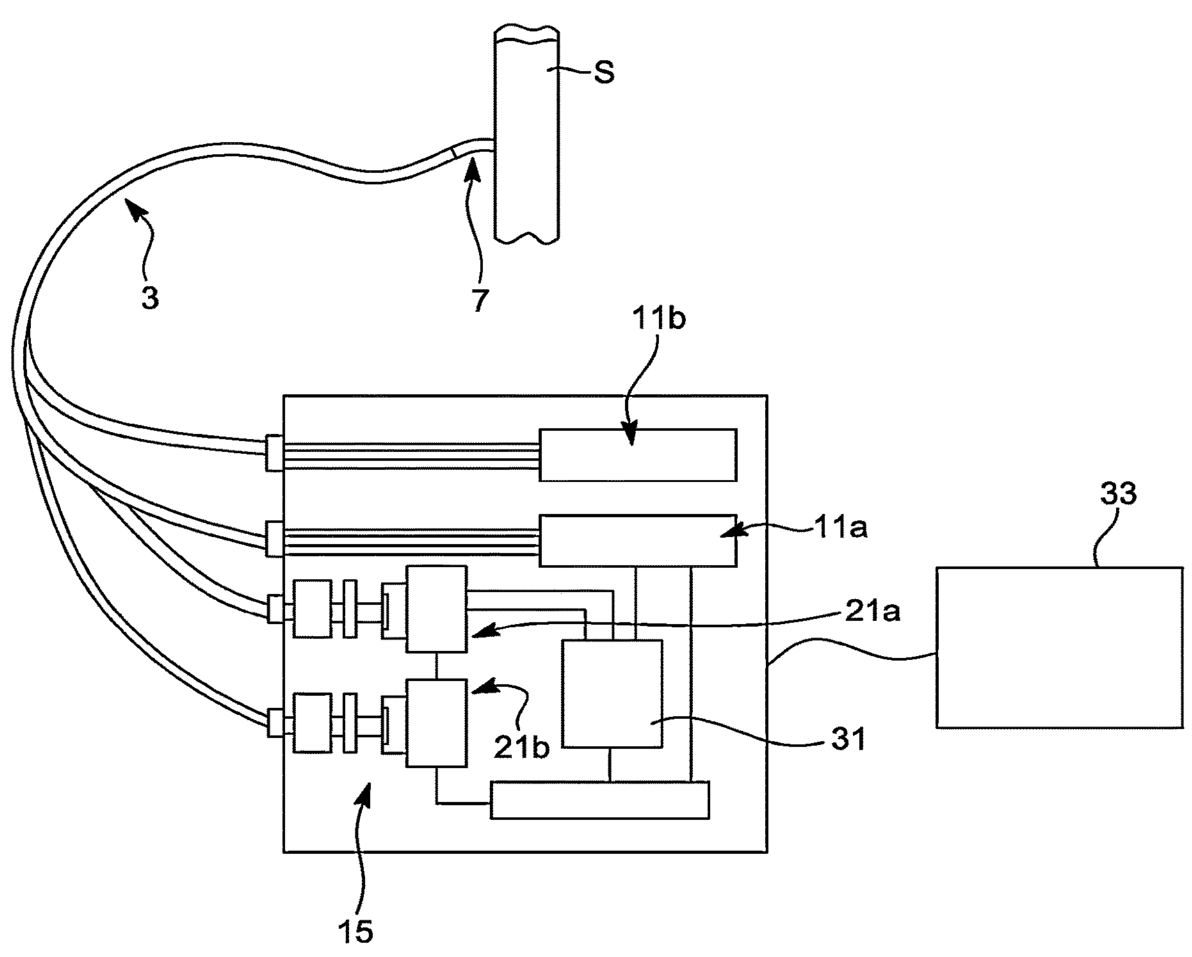
FIG. 12 illustrates a detection system as another modification of the system of FIG. 1.

In yet another modification, as illustrated in FIG. 12, the system could comprise a plurality of light sources 11*a, b*, each having a different excitation wavelength, and a plurality of detectors 21*a, b*, each for detecting light at different wavelengths.

Figure 13:
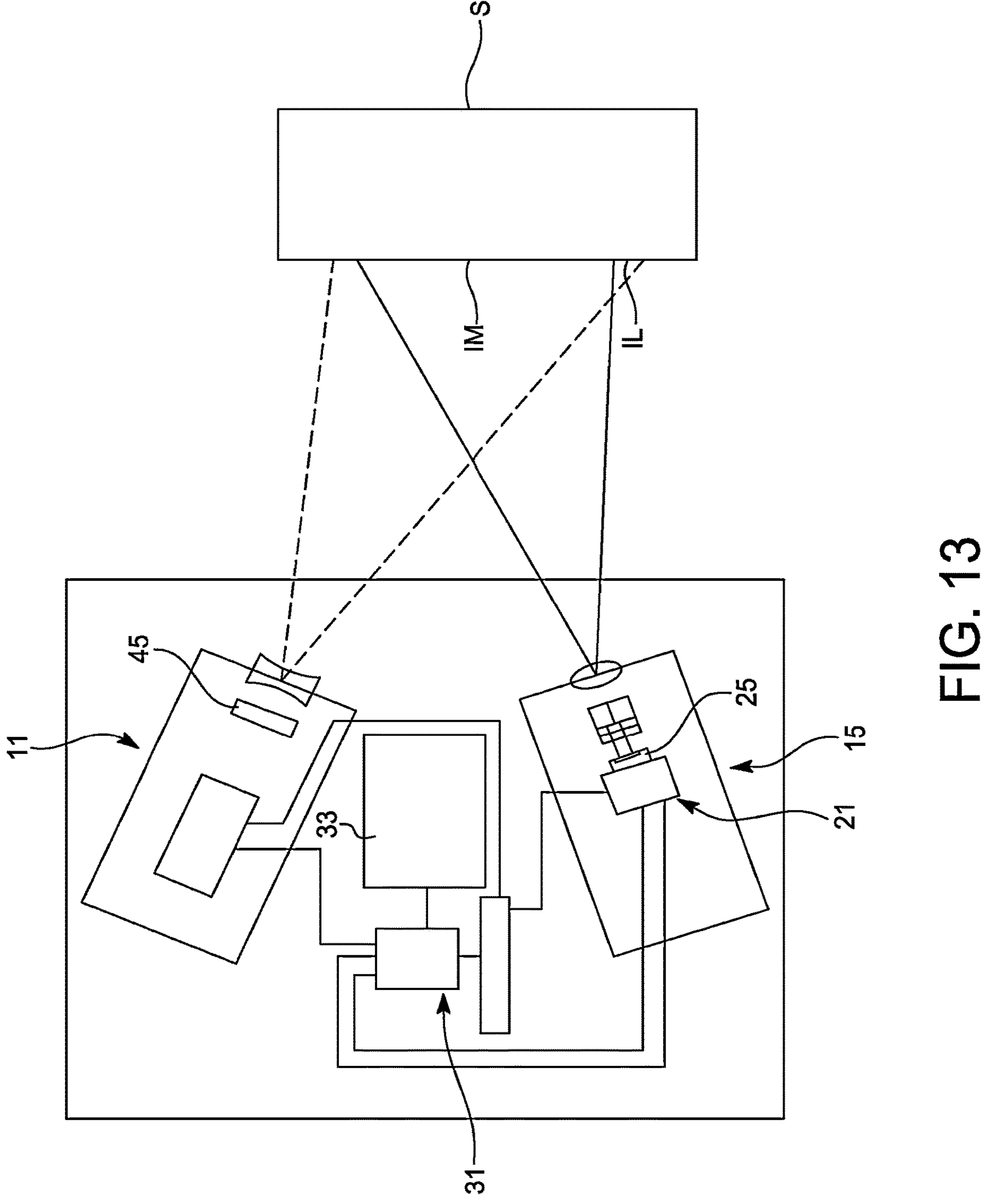
FIG. 13 illustrates a detection system as a further modification of the system of FIG. 1.

In still yet another modification, as illustrated in FIG. 13, the light source 11 could be a pulsed light source and configured to illuminate a two-dimensional illumination area IL on a sample S with excitation light, and the detector unit 15 could be configured as a camera which images a two-dimensional image area IM, as a field of view, on the sample S repeatedly at different delay times so as to acquire a lifetime decay from luminescent material applied to the sample S.

In this embodiment the light source 11 includes an intensity regulator 45, in addition to the intensity regulator 25 which is incorporated in the detector unit 15.

In alternative embodiments the intensity regulator 45 could be omitted from the light source 11 or the intensity regulator 25 could be omitted from the detector unit 15.

By way of example, the benefit of controlling the intensity of the output signal of the at least one detector 21 will be described with reference to FIG. 14(*a*) to (*c*).

Figure 14:
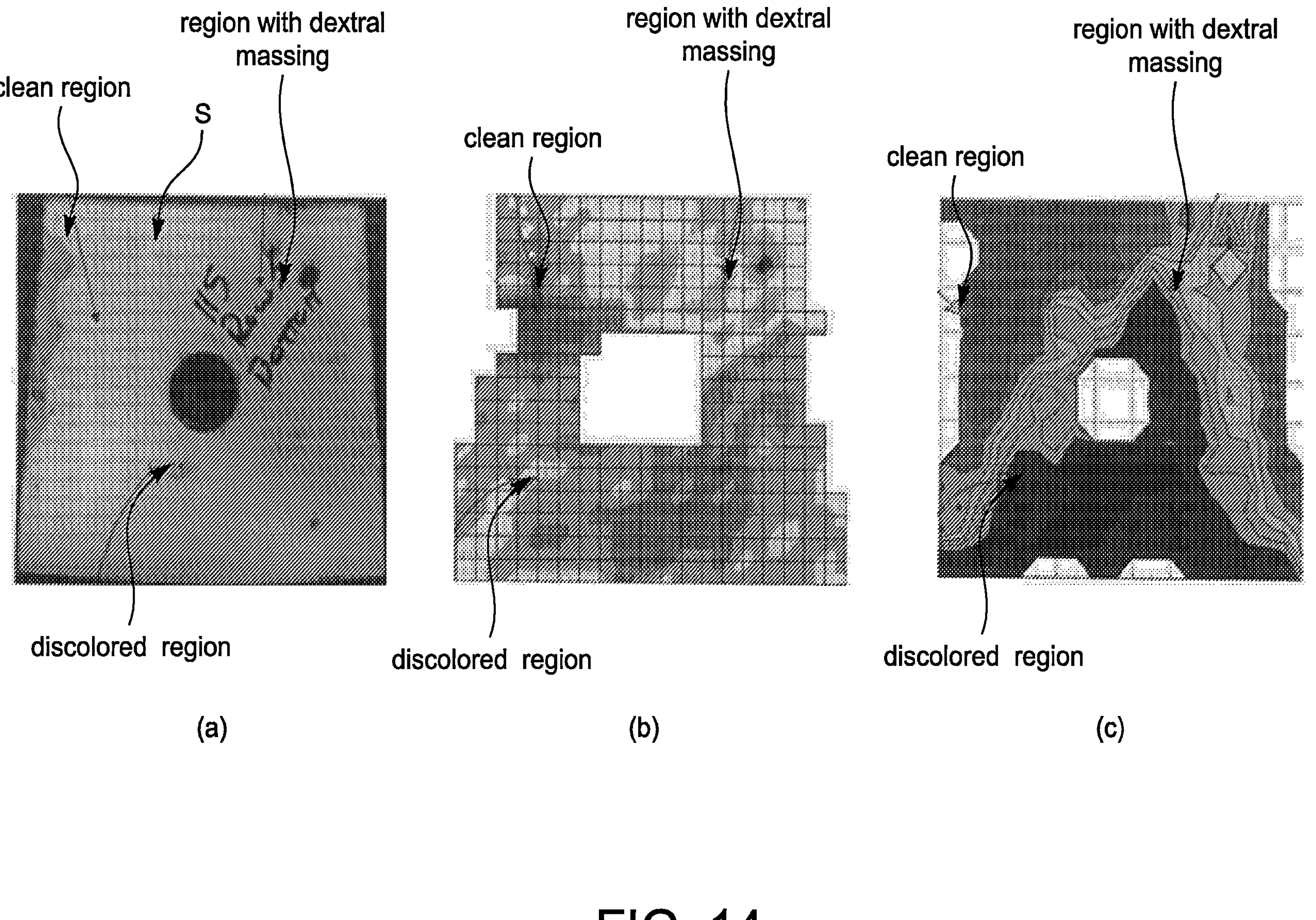
FIG. 14(*a*) to (*c*) illustrate respectively a photograph of a sample, an image acquired using the system of FIG. 1 without any intensity control, and an image acquired using the system of FIG. 1 with the application of intensity control.

FIG. 14(*a*) illustrates a photograph of a sample S, being an engine component, which has been subjected to a high-temperature thermal environment, some regions of which remain clean and some regions of which have become discoloured, and also including a textual sample reference applied during disassembly in indelible ink.

FIG. 14(*b*) illustrates an image acquired using the at least one detector 21 without any intensity control. As will be seen, a clean region of the sample S has high signal intensity, and a discoloured region and the region with textual marking, which would be expected to have high signal intensity, have lower signal intensity.

FIG. 14(*c*) illustrates an image acquired using the at least one detector 21 with the application of intensity control. As will be seen, the clean region of the sample S has high signal intensity, and the discoloured region and the region with textual marking also have high signal intensity, as expected.

The above described embodiments have been given by way of example only, and the skilled reader will naturally appreciate that many variations could be made thereto without departing from the scope of the invention.

The invention claimed is:

1. A detection system for detecting an optical signal from a luminescent material applied to or incorporated within an object, the system comprising:

at least one light source which generates light, as excitation light, for illuminating at least a region of the object;

at least one detector which detects light, as collection light, from the object when illuminated by the excitation light and provides an output signal having a signal intensity in response to an intensity of the collection light;

a controller which is adapted to control the output signal to have a signal intensity within a predetermined range or at substantially a constant value, or post-process the output signal to extract the output signal at a signal intensity within a predetermined range or at substantially a constant value;

an optical probe assembly which comprises a fiber and a probe which is optically connected to the fiber so as to allow for transmission of the excitation light to and collection of the collection light from the object, wherein the fiber comprises at least one excitation fiber element through which the excitation light is delivered to the probe, and a plurality of collection fiber elements disposed radially outwardly of the at least one excitation fiber element through which the collection light is delivered to the at least one detector; and at least one intensity regulator for regulating an intensity of the collection light which is collected by the at least one detector, the at least one intensity regulator being a liquid crystal, which, by application of a bias voltage, regulates the intensity of the collection light, wherein the at least one intensity regulator is configured to maintain the intensity of the output signal of the at least one detector at a constant value; and wherein a measured lifetime decay of the luminescent material is substantially constant.

2. The system of claim 1, wherein the probe comprises an optical arrangement which includes a lens for delivering the excitation light from the at least one excitation fiber element to an illumination spot and for delivering the collection light from the illumination spot to the at least one collection fiber element, wherein optionally the illumination spot has a diameter of from about 50 μm to about 1500 μm, wherein optionally the optical arrangement is configured to transmit and collect light (i) along an optical axis of the probe, optionally up to about 45 degrees in relation to the optical axis of the probe, or (ii) laterally of an optical axis of the probe, optionally from about 45 degrees to about 90 degrees in relation to the optical axis of the probe.

3. The system of claim 1, wherein the at least one light source (i) is a laser, optionally a pulse-modulated laser, optionally having a controllable modulation duty cycle, optionally a solid-state laser, optionally a diode-pumped, solid-state laser, (ii) comprises one or more laser diodes, or (iii) comprises one or more light-emitting diodes (LEDs), optionally one or more high-power LEDs.

4. The system of claim 1, wherein the excitation light has (i) a wavelength within a range of from about 250 nm to about 1100 nm, optionally a wavelength of about 532 nm or about 266 nm, and/or (ii) a power of from about 100 mW to about 2 KW, optionally operating in a continuous-wave mode.

5. The system of claim 1, further comprising:

(I) at least one filter, optionally transmissive or reflective, for regulating a wavelength of the collection light which is collected by the at least one detector, wherein optionally the at least one filter is a bandpass filter, wherein optionally the at least one filter is configured to filter out light of wavelengths outside the range of from about 450 nm to about 1600 nm.

6. The system of claim 1, wherein the at least one detector is (i) a photomultiplier module, optionally a silicon photomultiplier module (SiPM), (ii) a photodiode, optionally an avalanche photodiode, (iii) a photomultiplier tube (PMT), (iv) a multipixel photon counting device (MPPC), (v) a charge-coupled device (CCD), or (vi) a complementary metal-oxide-semiconductor (CMOS) device.

7. The system of claim 1, wherein the at least one detector is (I) a one-dimensional array, optionally a spectrometer, wherein optionally the controller is configured to determine an intensity ratio of two emission peaks, with an amplitude of one peak being controlled to a desired level, as a control peak, and an intensity of the other peak being measured, as a measured peak, with a ratio of the intensities of the control and measured peaks being determined as the intensity ratio, or (II) a two-dimensional array, optionally a camera, wherein optionally the at least one light source is a pulsed light source and configured to illuminate a two-dimensional illumination area on the object with the excitation light, and the at least one detector images a two-dimensional image area, as a field of view, on the object repeatedly at different delay times so as to acquire a lifetime decay.

8. The system of claim 1, wherein the output signal of the at least one detector represents (i) a lifetime decay, or (ii) a phase shift observed in a time response of an output of the at least one detector when the at least one light source is sinusoidally modulated.

9. The system of claim 1, wherein the output signal of the at least one detector represents a lifetime decay.

10. The system of claim 1, wherein the intensity of the collection light is regulated by (I) adjusting a gain value of the at least one detector, wherein optionally the gain value of the at least one detector is regulated by a temperature-dependent proportional-integral-derivative (PID) controller, so as to minimize influence of change in temperature on the at least one detector, and/or (II) regulating an intensity of the excitation light, optionally (i) by modulating a power of the at least one light source, (ii) using a diffractive variable attenuator (DVA), or (iii) using an acousto-optic modulator (AOM).

11. The system of claim 1, comprising:

a plurality of light sources, each having a different wavelength, and a plurality of detectors, each for collecting the collection light at a different wavelength.

12. A method of detecting an optical signal from a luminescent material applied to or incorporated within an object, comprising:

providing a detection system comprising at least one light source which generates light, as excitation light, which illuminates at least a region of the object, at least one detector which detects light, as collection light, from the object when illuminated by the excitation light and provides an output signal having a signal intensity in response to an intensity of the collection light; and controlling the output signal to have a signal intensity within a predetermined range or at substantially a constant value, or post-processing the output signal to extract the output signal at a signal intensity within a predetermined range or at substantially a constant value, wherein the system further comprises:

an optical probe assembly which comprises a fiber and a probe which is optically connected to the fiber so as to transmit the excitation light to and collect the collection light from the object, wherein the fiber comprises at least one excitation fiber element through which the excitation light is delivered to the probe, a plurality of collection fiber elements, disposed radially outwardly of the at least one excitation fiber element through which the collection light is delivered to the at least one detector, and at least one intensity regulator for regulating an intensity of the collection light which is collected by the at least one detector, the at least one intensity regulator being a liquid crystal, which, by application of a bias voltage, regulates the intensity of the collection light, wherein the at least one intensity regulator is configured to maintain the intensity of the output signal of the at least one detector at a constant value; and wherein a measured lifetime decay of the luminescent material is substantially constant.

13. The method of claim 12, wherein the probe comprises an optical arrangement which includes a lens for delivering the excitation light from the at least one excitation fiber element to an illumination spot and for delivering the collection light from the illumination spot to the at least one collection fiber element, wherein optionally the illumination spot has a diameter of from about 50 μm to about 1500 μm, wherein optionally the optical arrangement is configured to transmit and collect light (i) along an optical axis of the probe, optionally up to about 45 degrees in relation to the optical axis of the probe, or (ii) laterally of an optical axis of the probe, optionally from about 45 degrees to about 90 degrees in relation to the optical axis of the probe.

14. The method of claim 12, wherein the at least one light source (i) is a laser, optionally a pulse-modulated laser, optionally having a controllable modulation duty cycle, optionally a solid-state laser, optionally a diode-pumped, solid-state laser, (ii) comprises one or more laser diodes, or (iii) comprises one or more light-emitting diodes (LEDs), optionally one or more high-power LEDs.

15. The method of claim 12, wherein the excitation light has (i) a wavelength within a range of from about 250 nm to about 1100 nm, optionally a wavelength of about 532 nm or about 266 nm, and/or (ii) a power of from about 100 mW to about 2 KW, optionally operating in a continuous-wave mode.

16. The method of claim 12, wherein the system further comprises (I) at least one filter, optionally transmissive or reflective, to regulate a wavelength of the collection light which is collected by the at least one detector, wherein optionally the at least one filter is a bandpass filter, optionally the at least one filter is configured to filter out light of wavelengths outside the range of from about 450 nm to about 1600 nm.

17. The method of claim 12, wherein the at least one detector is (i) a photomultiplier module, optionally a silicon photomultiplier module (SiPM), (ii) a photodiode, optionally an avalanche photodiode, (iii) a photomultiplier tube (PMT), (iv) a multipixel photon counting device (MPPC), (v) a charge-coupled device (CCD), or (vi) a complementary metal-oxide-semiconductor (CMOS) device.

18. The method of claim 12, wherein the at least one detector is (I) a one-dimensional array, optionally a spectrometer, optionally further comprising:

determining an intensity ratio of two emission peaks, with an amplitude of one peak being controlled to a desired level, as a control peak, and an intensity of the other peak being measured, as a measured peak, with a ratio of the intensities of the control and measured peaks being determined as the intensity ratio; or (II) a two-dimensional array, optionally a camera, wherein optionally the at least one light source is a pulsed light source and further comprising:

illuminating a two-dimensional illumination area on the object with the excitation light; and imaging a two-dimensional image area, as a field of view, on the object repeatedly at different delay times so as to acquire a lifetime decay.

19. The method of claim 12, wherein the output signal of the at least one detector represents (i) a lifetime decay, or (ii) a phase shift observed in a time response of an output of the at least one detector when the at least one light source is sinusoidally modulated.

20. The method of claim 12, wherein the output signal of the at least one detector represents a lifetime decay.

21. The method of claim 12, wherein the intensity of the collection light is regulated by (I) adjusting a gain value of the at least one detector, wherein optionally the gain value of the at least one detector is regulated by a temperature-dependent proportional-integral-derivative (PID) controller, so as to minimize influence of change in temperature on the at least one detector, and/or (II) regulating an intensity of the excitation light, optionally (i) by modulating a power of the at least one light source, (ii) using a diffractive variable attenuator (DVA), or (iii) using an acousto-optic modulator (AOM).

22. The method of claim 12, wherein the system comprises a plurality of light sources, each having a different wavelength, and a plurality of detectors, each for collecting the collection light at a different wavelength.

23. The system of claim 1, further comprising a beam splitter which is one of transmissive or reflective to light at a wavelength of the excitation light and the other of transmissive or reflective to light at a wavelength of the collection light, such that the excitation light is one of transmitted through or reflected by the beam splitter to the object and the collection light is the other of transmitted through or reflected by the beam splitter to the at least one detector.

24. The system of claim 1, wherein the at least one intensity regulator is disposed between the object and the at least one detector, and/or wherein the at least one intensity regulator is controlled by the controller to regulate the intensity of the collection light which is received by the at least one detector, the intensity of the collection light is regulated by (i) applying a continuously-increasing bias voltage across a full dynamic range of the at least one intensity regulator, or (ii) closed-loop control between the at least one intensity regulator and the at least one detector, and/or wherein the system comprises:

a plurality of intensity regulators, optionally a first intensity regulator between the at least one light source and the object and a second intensity regulator between the object and the at least one detector.

25. The method of claim 12, wherein the system further comprises a beam splitter which is one of transmissive or reflective to light at a wavelength of the excitation light and the other of transmissive or reflective to light at a wavelength of the collection light, such that the excitation light is one of transmitted through or reflected by the beam splitter to the object and the collection light is the other of transmitted through or reflected by the beam splitter to the at least one detector.

26. The method of claim 12, wherein the at least one intensity regulator is disposed between the object and the at least one detector, and/or the at least one intensity regulator is controlled by the controller to regulate the intensity of the collection light which is received by the at least one detector, and/or the intensity of the collection light is regulated by (i) applying a continuously-increasing bias voltage across a full dynamic range of the at least one intensity regulator, or (ii) closed-loop control between the at least one intensity regulator and the at least one detector; and/or wherein the system comprises a plurality of intensity regulators, optionally a first intensity regulator between the at least one light source and the object and a second intensity regulator between the object and the at least one detector.

* * * * *